US009654987B2

(12) United States Patent
Hwang

(10) Patent No.: US 9,654,987 B2
(45) Date of Patent: May 16, 2017

(54) INTERFERENCE ALIGNMENT METHOD AND APPARATUS IN WIRELESS COMMUNICATION SYSTEM

(71) Applicant: Samsung Electronics Co. Ltd., Suwon-si, Gyeonggi-do (KR)

(72) Inventor: Duck-Dong Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 863 days.

(21) Appl. No.: 13/755,596

(22) Filed: Jan. 31, 2013

(65) Prior Publication Data
US 2013/0203428 A1    Aug. 8, 2013

(30) Foreign Application Priority Data
Feb. 2, 2012 (KR) .................. 10-2012-0010838

(51) Int. Cl.
*H04W 72/08* (2009.01)
*H04W 72/00* (2009.01)
*H04W 24/02* (2009.01)
*H04B 7/0452* (2017.01)
*H04B 7/06* (2006.01)

(52) U.S. Cl.
CPC .......... *H04W 24/02* (2013.01); *H04B 7/0452* (2013.01); *H04B 7/0665* (2013.01); *H04W 72/082* (2013.01)

(58) Field of Classification Search
CPC ... H04W 72/082; H04B 7/0456; H04B 15/00; H04B 1/7103; H04B 7/0617
USPC ........................................................ 455/450
See application file for complete search history.

(56) References Cited

U.S. PATENT DOCUMENTS

| 2010/0227613 | A1  | 9/2010  | Kim et al.       |           |
|--------------|-----|---------|------------------|-----------|
| 2010/0227637 | A1  | 9/2010  | Kwon et al.      |           |
| 2010/0309998 | A1* | 12/2010 | Jung ............ | H04B 7/024 |
|              |     |         |                  | 375/260   |
| 2011/0009125 | A1* | 1/2011  | Shin ............ | H04B 7/024 |
|              |     |         |                  | 455/452.1 |
| 2011/0064035 | A1  | 3/2011  | Guerreiro et al. |           |

(Continued)

FOREIGN PATENT DOCUMENTS

| CN | 102136857 A | 7/2011  |
|----|-------------|---------|
| CN | 102255642 A | 11/2011 |

(Continued)

OTHER PUBLICATIONS

Suh et al., "Downlink Interference Alignment," IEEE Transactions on Communications, Sep. 2011, pp. 2616-2626, vol. 59, No. 9.

*Primary Examiner* — Omoniyi Obayanju
(74) *Attorney, Agent, or Firm* — Jefferson IP Law, LLP

(57) ABSTRACT

An interference alignment method and apparatus in a wireless communication system are provided. A method of a serving Base Station (BS) for uplink interference alignment in a wireless communication system includes estimating a channel for at least one served Mobile Station (MS), estimating an interference channel for at least one neighboring MS, exchanging information about an interference channel with at least one neighboring BS, determining a precoding vector of each of the at least one served MS for configuring interference from all of the at least one neighboring MS as one spatial dimension, and transmitting the determined precoding vector to each of the at least one served MSs.

18 Claims, 9 Drawing Sheets

(56) References Cited

U.S. PATENT DOCUMENTS

| | | |
|---|---|---|
| 2011/0090882 A1 | 4/2011 | Lee et al. |
| 2011/0177834 A1 | 7/2011 | Shin et al. |
| 2011/0235750 A1 | 9/2011 | Shin et al. |
| 2013/0279422 A1* | 10/2013 | Kim .................. H04B 7/024 370/328 |

FOREIGN PATENT DOCUMENTS

| | | |
|---|---|---|
| EP | 2 410 781 A1 | 1/2012 |
| KR | 10-2011-0035555 A | 4/2011 |

* cited by examiner

INTERFERENCE ALIGNMENT METHOD AND APPARATUS IN WIRELESS COMMUNICATION SYSTEM

PRIORITY

This application claims priority under 35 U.S.C. §119(a) to a Korean patent application filed on Feb. 2, 2012 in the Korean Intellectual Property Office and assigned Serial No. 10-2012-0010838, the entire disclosure of which is hereby incorporated by reference.

BACKGROUND OF THE INVENTION

1. Field of the Invention

The present invention relates to an interference alignment method and apparatus in a wireless communication system. More particularly, the present invention relates to a method and apparatus for aligning interference in a multi-cell and multi-antenna environment.

2. Description of the Related Art

A Mobile Station (MS) and a Base Station (BS) may receive interference signals from neighboring MSs and neighboring BSs in a communication system. The interference signal is one of the main causes of reducing a data transfer rate and a reliability of communication.

Accordingly, to improve the data transfer rate and communication reliability, there is ongoing research on reducing interference of neighboring MSs and neighboring BSs. For one example, related-art technologies are being provided for performing interference alignment in a multi-user channel environment in which two cells interfere in each other. However, there is a disadvantage that, because a plurality of cells exert interference to one another in an actual cellular environment, it is difficult to apply a two-cell based interference alignment technique to the actual cellular environment.

Therefore, a need exists for a method and apparatus that addresses at least the problems and/or disadvantages described above.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide a method and apparatus for aligning interference in a wireless communication system.

Another aspect of the present invention is to provide an interference alignment method and apparatus for configuring, as one spatial dimension, interference vectors to a Mobile Station (MS) or a Base Station (BS) in a communication system of a multi-cell and multi-antenna environment.

Yet another aspect of the present invention is to provide a method and apparatus for determining a precoding vector for configuring, as one spatial dimension, interference vectors from neighboring MSs to a BS in a communication system of a multi-cell and multi-antenna environment.

Still another aspect of the present invention is to provide a method and apparatus for determining a precoding vector for configuring, as one spatial dimension, interference vectors from neighboring BSs to an MS in a communication system of a multi-cell and multi-antenna environment.

The above aspects are addressed by providing an interference alignment method and apparatus in a wireless communication system.

In accordance with an aspect of the present invention, a method of a serving BS for uplink interference alignment in a wireless communication system is provided. The method includes estimating a channel for at least one served MS, estimating an interference channel for at least one neighboring MS, exchanging information about an interference channel with at least one neighboring BS, determining a precoding vector of each of the at least one served MS for configuring interference from all of the at least one neighboring MS as one spatial dimension, and transmitting the determined precoding vector to each of the at least one served MSs.

In accordance with another aspect of the present invention, a method of a MS for uplink interference alignment in a wireless communication system is provided. The method includes receiving a precoding vector for configuring interference in at least one neighboring BS as one spatial dimension, from a serving BS, and transmitting a signal to the serving BS by using the received precoding vector.

In accordance with yet another aspect of the present invention, a method of a serving BS for downlink interference alignment in a wireless communication system is provided. The method includes broadcasting unique vector information corresponding to the serving BS, receiving information of a precoding vector from at least one served MS, and transmitting a signal to a corresponding served MS by using the precoding vector.

In accordance with still another aspect of the present invention, a method of an MS for downlink interference alignment in a wireless communication system is provided. The method includes acquiring unique vector information from a serving BS and at least one neighboring BS, estimating a channel for the serving BS, estimating an interference channel for the at least one neighboring BS, determining a precoding vector for configuring interference from all of the at least one neighboring BS as one spatial dimension, and transmitting the determined precoding vector to the serving BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
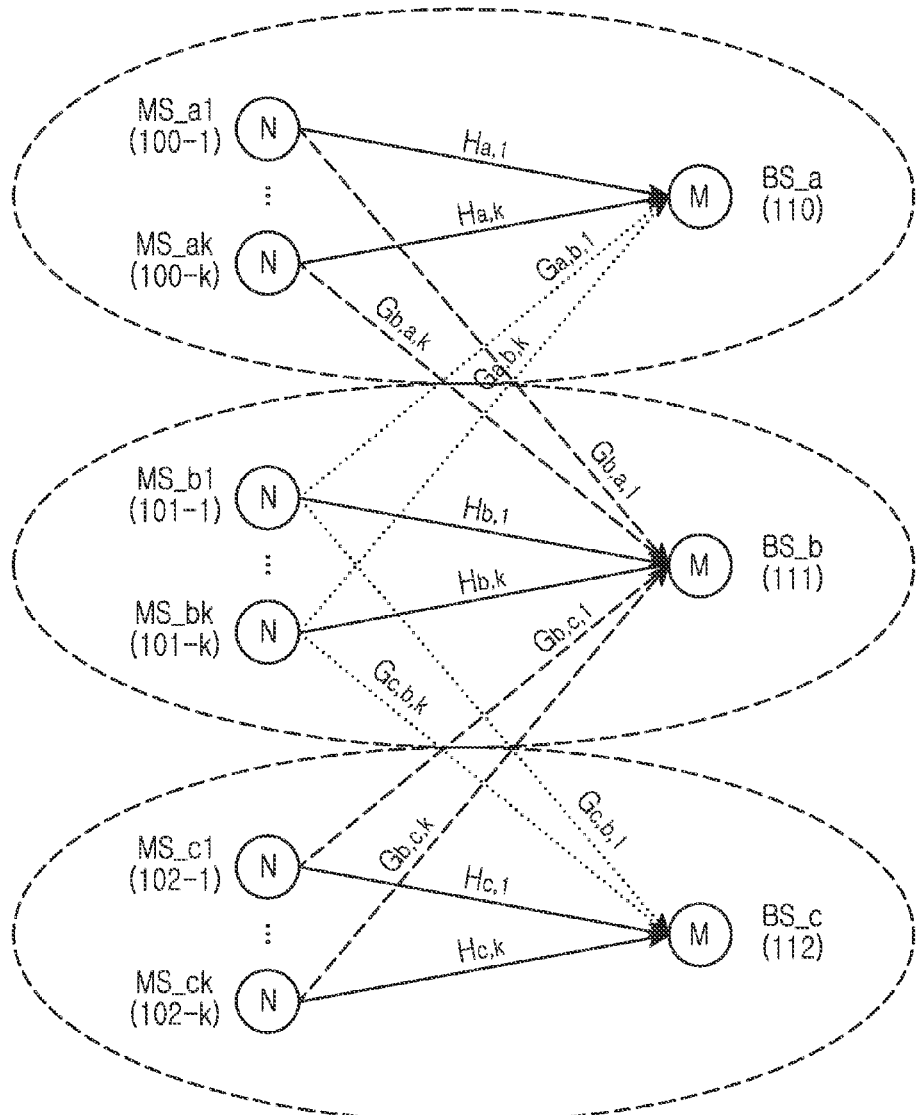
FIG. 1 is a diagram illustrating a construction of a wireless communication system of a multi-cell and multi-antenna environment according to an exemplary embodiment of the present invention.

The exemplary embodiments of the present invention described herein include a method and apparatus for aligning interference in a wireless communication system of a multi-cell and multi-antenna environment. A case where three cells are adjacent to one another is described, for example, as illustrated in FIG. 1 below. However, even when more than three cells are adjacent to one another, the present invention can be applied using the scheme described herein.

FIG. 1 illustrates a construction of a wireless communication system of a multi-cell and multi-antenna environment according to an exemplary embodiment of the present invention.

Referring to FIG. 1, a BS_a 110, a BS_b 111, and a BS_c 112 are located in areas adjacent to one another. The BS_a 110, the BS_b 111, and the BS_c 112 each communicate with a plurality of MSs that are located within a corresponding cell area. That is, the BS_a 110 transmits/receives signals with an MS_a1 100-1 to an MS_ak 100-$k$ that are located within a cell area of the BS_a 110, and the BS_b 111 transmits/receives signals with an MS_b1 101-1 to an MS_bk 101-$k$ that are located within a cell area of the BS_b 111, and the BS_c 112 transmits/receives signals with an MS_c1 102-1 to an MS_ck 102-$k$ that are located within a cell area of the BS_c 112.

In this situation, uplink signals that the MS_a1 100-1 to MS_ak 100-$k$ transmit to the BS_a 110 and uplink signals that the MS_c1 102-1 to MS_ck 102-$k$ transmit to the BS_c 112 can act as interfering signals to the BS_b 111. Also, downlink signals that the BS_a 110 transmits to the MS_a1 100-1 to MS_ak 100-$k$ and downlink signals that the BS_c 112 transmits to the MS_c1 102-1 to MS_ck 102-$k$ can act as interfering signals to the MS_b1 101-1 to MS_bk 101-$k$.

Therefore, the present exemplary embodiment provides an interference alignment scheme for eliminating the aforementioned interference signals as follows. Here, for description convenience, the uplink is described as an example. However, the present exemplary embodiment can be equally applied to the downlink using the same described herein.

Referring to FIG. 1, the present exemplary embodiment assumes that each BS has 'M' number of antennas, and each MS has 'N' number of antennas. Here, 'H' denotes a channel from each MS to a serving BS, and 'G' denotes an interference channel from each MS to a neighboring BS. The channels 'H' and the interference channels 'G' form an (M×N) matrix.

In a situation where the BS_a 110, the BS_b 111, and the BS_c 112 are adjacent to one another as described above, a signal ($r_b$) received through the 'M' number of antennas of the BS_b 111 can be expressed as in Equation 1 shown below.

$$r_b = \sum_{k=1}^{K} (H_{b,k} w_{b,k} x_{b,k} + G_{b,a,k} w_{a,k} x_{a,k} + G_{b,c,k} w_{c,k} x_{c,k}) + n_b \quad (1)$$

In Equation 1 shown above, '$k$' means a $k$-th user belonging to each BS, '$H_{b,k}$' means a channel from a $k$-th MS (i.e., the MS_bk 101-$k$), which belongs to the BS_b 111, '$w_{b,k}$' means an (N×1) precoding vector of the MS_bk 101-$k$, the '$x_{b,k}$' means a signal that the MS_bk 101-$k$ transmits to the BS_b 111, and '$G_{b,a,k}$' means an interference channel from a $k$-th MS (i.e., the MS_ak 100-$k$), which belongs to the BS_a 110, to the BS_b 111.

Here, when interference vectors of the MS_a1 100-1 to MS_ak 100-$k$ belonging to the BS_a 110 and the MS_c1 102-1 to MS_ck 102-$k$ belonging to the BS_c 112 occupy only one spatial dimension in a space composed of the 'M' number of antennas of the BS_b 111, the remnant (M−1) number of spatial dimensions become a space having no interference from the MS_a1 100-1 to MS_ak 100-$k$ and the MS_c1 102-1 to MS_ck 102-$k$. Therefore, the BS_b 111 can communicate, without interference, with the MS_b1 101-1 to MS_bk 101-$k$ that itself serves, by using the remnant (M−1) number of spatial dimensions having no interference from the MS_a1 100-1 to MS_ak 100-k and the MS_c1 102-1 to MS_ck 102-k. Accordingly, the present exemplary embodiment configures interference vectors of neighboring MSs belonging to neighboring BSs such that the interference vectors occupy only one spatial dimension in a space composed of the 'M' number of antennas of a serving BS.

Equation 2 shown below represents, for example for BS_b 111, that interference vectors of the MS_a1 100-1 to MS_ak 100-k belonging to the BS_a 110 and the MS_c1 102-1 to MS_ck 102-k belonging to the BS_c 112 occupy one spatial dimension in a space composed of the 'M' number of antennas of the BS_b 111.

$$\text{rank}([G_{b,a,1}w_{a,1} \ldots G_{b,a,K}w_{a,K}G_{b,c,1}w_{c,1} \ldots G_{b,c,K}w_{c,K}]) = 1 \quad (2)$$

In Equation 2 shown above, '$G_{b,a,1}w_{a,1}$' means an interference vector from a first MS (i.e., the MS_a1 100-1), which belongs to the BS_a 110, to the BS_b 111.

In order for interference vectors of neighboring BSs to occupy only one spatial dimension in a serving BS as in Equation 2 shown above, the interference vectors of the neighboring BSs satisfy Equation 3 and Equation 4 shown below.

$$G_{b,a,1}w_{a,1} = \ldots = G_{b,a,K}w_{a,K} = G_{b,c,1}w_{c,1} = \ldots = G_{b,c,K}w_{c,K} = g_b \quad (3)$$

$$G_{a,b,k}w_{b,k} = g_a, G_{c,b,k}w_{b,k} = g_c, k=1, \ldots, K \quad (4)$$

Here, the '$g_a$', '$g_b$', and '$g_c$' represent unique (M×1) vectors of the BS_a 110, the BS_b 111, and the BS_c 112, respectively. The '$g_a$', '$g_b$', and '$g_c$' are defined previously. That is, an interference vector ($G_{b,a,K}w_{a,K}$) from the MS_ak 100-k, which belongs to the BS_a 110, to the BS_b 111 and an interference vector ($G_{b,c,K}w_{c,K}$) from the MS_ck 102-k, which belongs to the BS_c 112, to the BS_b 111 have the same spatial dimension as the unique vector ($g_b$) of the BS_b 111, an interference vector ($G_{a,b,k}w_{b,k}$) from the MS_bk 101-k, which belongs to the BS_b 111, to the BS_a 110 has the same spatial dimension as the unique vector ($g_a$) of the BS_a 110, and an interference vector ($G_{c,b,k}w_{b,k}$) from the MS_bk 101-k, which belongs to the BS_b 111, to the BS_c 112 has the same spatial dimension as the unique vector ($g_c$) of the BS_c 112.

Therefore, the present exemplary embodiment determines a precoding vector meeting Equation 3 and Equation 4 shown above.

Equation 5 shown below represents the precoding vector meeting Equation 3 and Equation 4 shown above.

$$w_{b,k} = G_{b,k}^{-1}\tilde{g}_b, \; G_{b,k} = \begin{bmatrix} G_{a,b,k} \\ G_{c,b,k} \end{bmatrix}, \; \tilde{g}_b = \begin{bmatrix} g_a \\ g_b \end{bmatrix} \quad (5)$$

As given in Equation 5 shown above, the BS_b 111 determines a precoding vector of the MS_bk 101-k served by the BS_b 111, by using Equation 5 shown above. Also, even the BS_a 110 and BS_c 112 determine precoding vectors of the MS_ak 100-k and MS_ck 102-k served by the BS_a 110 and BS_c 112, in a scheme expressed in Equation 5 shown above.

Through the above scheme, an interference vector from a neighboring MS to each serving BS occupies only one spatial dimension in the corresponding serving BS. Therefore, each serving BS can transmit/receive signals with its served MSs by using spatial dimensions having no interference from neighboring MSs.

In the aforementioned description, the number 'N' of antennas of an MS and the number 'M' of antennas of a BS meet the condition of N≥(L−1)M. Here, 'L' denotes the number of BSs that consider interference. In the aforementioned description, a case has been described in which three BSs exert interference to one another, for example, and therefore, the 'L' is equal to '3'. Here, if the condition of N≥(L−1)M is not met, the BS may calculate the maximum number of antennas of the BS meeting the N≥(L−1)M among the 'M' number of antennas of the BS to use only antennas of the calculated maximum number of the BS. Also, the present exemplary embodiment may select only BSs of a predetermined number having high interference among a plurality of BSs exerting interference to one another to perform the aforementioned interference alignment.

An uplink interference alignment scheme is described below in detail with reference to FIG. 2 to FIG. 4, and a downlink interference alignment scheme is described below in detail with reference to FIG. 5 to FIG. 7.

Figure 2:
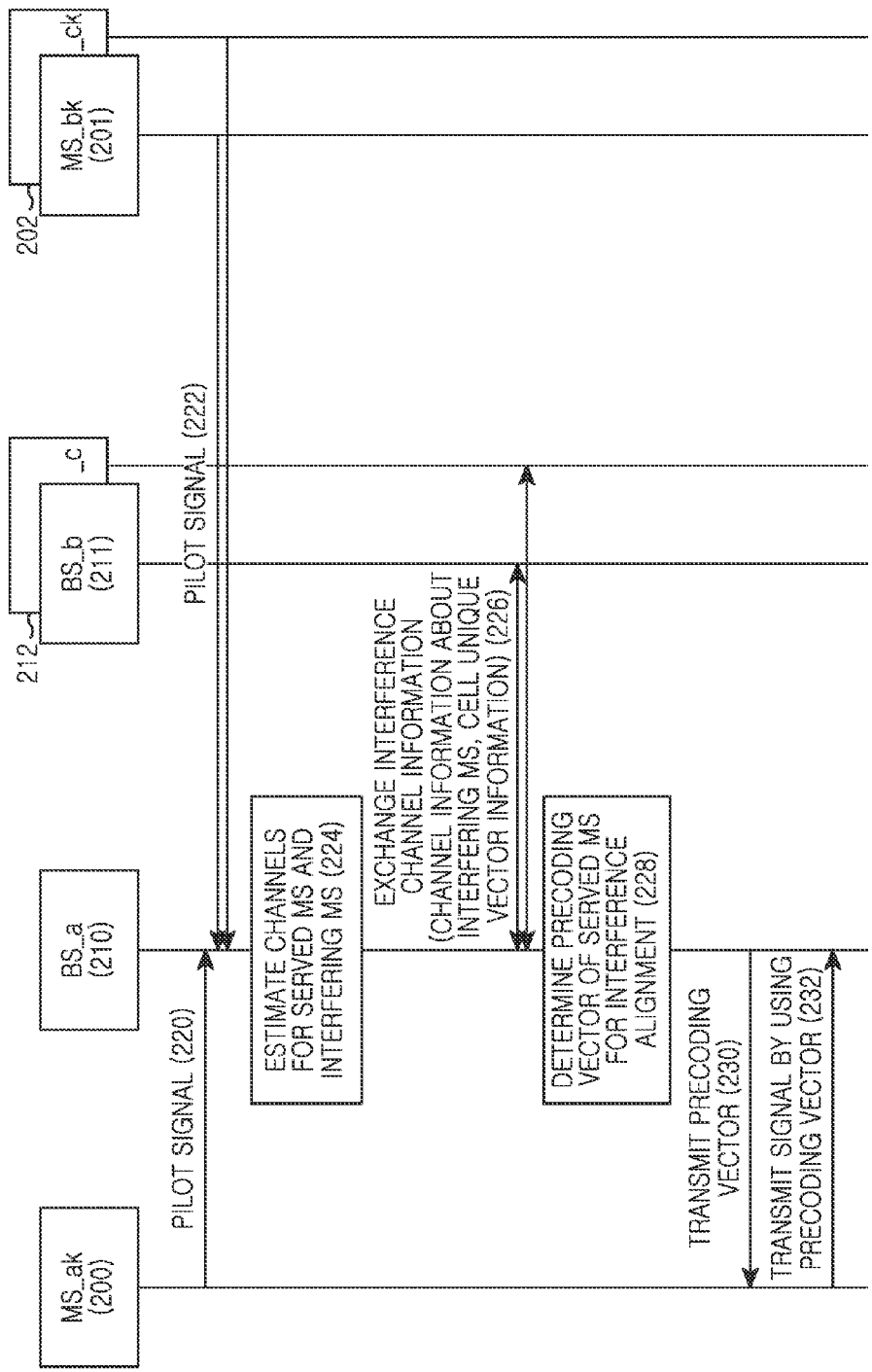
FIG. 2 is a ladder diagram illustrating a signal flow for uplink interference alignment in a wireless communication system according to an exemplary embodiment of the present invention.

FIG. 2 illustrates a signal flow for uplink interference alignment in a wireless communication system according to an exemplary embodiment of the present invention. Here, a BS_a 210, a BS_b 211, and a BS_c 212 are located in adjacent areas and exert interference to one another. Here, an MS_ak 200 is a k-th MS that communicates with the BS_a 210, an MS_bk 201 is a k-th MS that communicates with the BS_b 211, and an MS_ck 202 is a k-th MS that communicates with the BS_c 212. Also, it is assumed that N≥(L−1)M is met when the number of antennas of an MS is given 'N', the number of antennas of a BS is given 'M', and the number (L) of BSs exerting interference to one another is given '3'.

Referring to FIG. 2, in steps 220 and 222, the MS_ak 200, the MS_bk 201, and the MS_ck 202 each transmit a pilot signal to the BS_a 210. At this time, the BS_a 210 receives the pilot signal of the MS_ak 200 served by the BS_a 210 and the pilot signals of the neighboring MS_bk 201 and neighboring MS_ck 202 served by the neighboring BS_b 211 and neighboring BS_c 212.

After that, in step 224, the BS_a 210 estimates channels for a served MS (i.e., the MS_ak 200) and interfering MSs (i.e., the MS_bk 201 and MS_ck 202), by using the received pilot signals. For example, the BS_a 210 estimates a channel ($H_{a,k}$) for the MS_ak 200 and interference channels ($G_{a,b,k}$ and $G_{a,c,k}$) for the MS_bk 201 and MS_ck 202.

Next, in step 226, the BS_a 210 exchanges interference channel information with the neighboring BS_b 211 and neighboring BS_c 212. Here, the interference channel information represents channel information of interfering MSs estimated by each serving BS and cell unique vector information of each serving BS. For example, the BS_a 210 transmits the interference channel ($G_{a,b,k}$) estimated by the BS_a 210 and a unique vector ($g_a$) of the BS_a 210, to the neighboring BS_b 211, and the BS_a 210 transmits the interference channel ($G_{a,c,k}$) estimated by the BS_a 210 and the unique vector ($g_a$) of the BS_a 210, to the neighboring BS_c 212. Also, the BS_a 210 receives from the BS_b 211 an interference channel ($G_{b,a,k}$) estimated by the BS_b 211 and a unique vector ($g_b$) of the BS_b 211, and the BS_a 210 receives from the BS_c 212 an interference channel ($G_{c,a,k}$) estimated by the BS_c 212 and a unique vector ($g_c$) of the BS_c 212.

After that, in step 228, the BS_a 210 determines a precoding vector of each of its served MSs, by using the scheme expressed in Equation 5 shown above. That is, the BS_a 210 determines a precoding vector ($w_{a,k}$) of its served MS_ak 200 as given in Equation 6 shown below.

$$w_{a,k} = G_{a,k}^{-1} \tilde{g}_a, \ G_{a,k} = \begin{bmatrix} G_{b,a,k} \\ G_{c,a,k} \end{bmatrix}, \ \tilde{g}_a = \begin{bmatrix} g_b \\ g_c \end{bmatrix} \quad (6)$$

Next, in step 230, the BS_a 210 transmits the determined precoding vector ($w_{a,k}$) to the corresponding MS_ak 200. After that, in step 232, the MS_ak 200 transmits a signal to the BS_a 210 by using the received precoding vector ($w_{a,k}$).

Although not illustrated in FIG. 2, the BS_b 211 and BS_c 212 may also perform the processes of step 224 to step 230 using the scheme described herein, thereby being able to configure interference vectors from neighboring MSs to each serving BS, as one spatial dimension. According to this, the present exemplary embodiment can obtain an effect that each serving BS can communicate with its served MS through the (M−1) number of spatial dimensions having no interference from neighboring MSs.

In the aforementioned description, the BS_a 210 estimates channels by using pilot signals received from respective MSs. Unlike this, the BS_a 210 may estimate the channels by using sounding signals received from the respective MSs.

Figure 3:
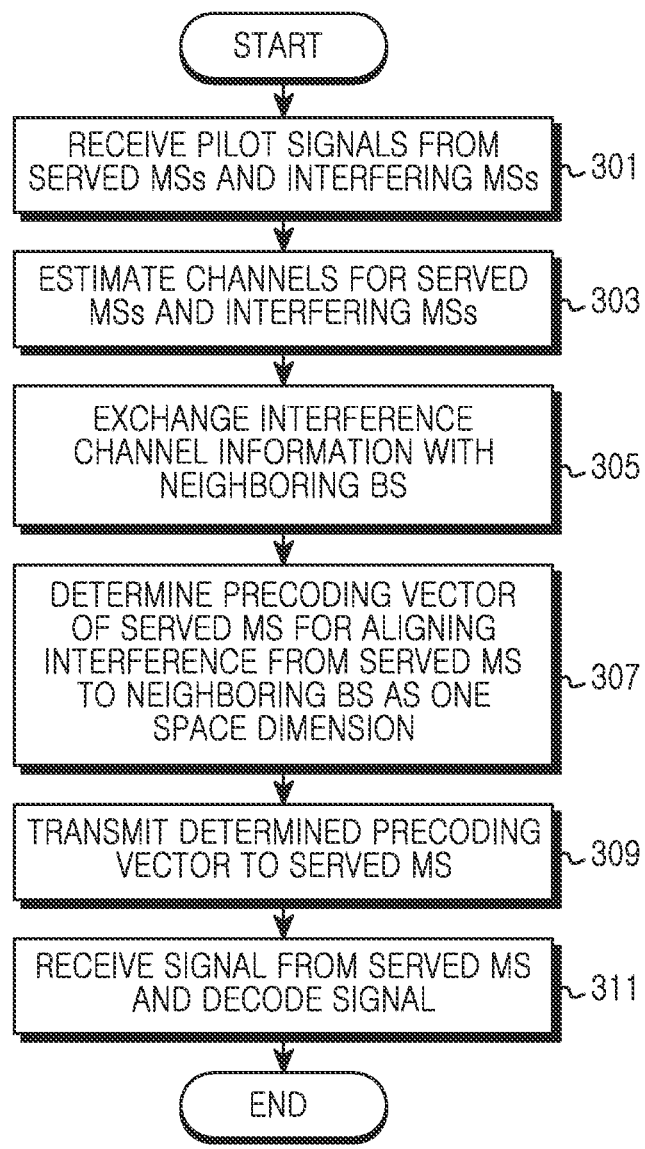
FIG. 3 is a flowchart illustrating an operation procedure of a serving Base Station (BS) in a wireless communication system according to an exemplary embodiment of the present invention.

FIG. 3 illustrates an operation procedure of a serving BS in a wireless communication system according to an exemplary embodiment of the present invention.

Referring to FIG. 3, in step 301, the serving BS receives pilot signals from served MSs and interfering MSs. Here, the interfering MS represents a neighboring MS located in a cell area of a neighboring BS that exerts interference mutually with the serving BS.

After that, in step 303, the serving BS estimates a channel for each of the served MSs and an interference channel for each of the interfering MSs. Then, the serving BS proceeds to step 305 and exchanges interference channel information with the neighboring BS. Here, the interference channel information includes an interference channel for each of interfering MSs estimated by each serving BS and unique vector information of each serving BS.

Next, in step 307, the serving BS determines a precoding vector of each of the served MSs for aligning interference from each of the served MSs to the neighboring BS as one spatial dimension in the neighboring BS. In an exemplary embodiment, the serving BS determines a precoding vector of each of the served MSs by using Equation 5 and Equation 6 shown above.

After that, the serving BS proceeds to step 309 and transmits the determined precoding vector of each of the served MSs, to the corresponding served MS.

Next, in step 311, the serving BS receives a signal from each of the served MSs and decodes the received signal. At this time, by setting a reception beamformer by using the precoding vector of each of the served MSs, the serving BS can form reception beams for the served MSs. At this time, the serving BS can eliminate interference between the served MSs by using a zero-forcing technique.

After that, the serving BS terminates the algorithm according to the present exemplary embodiment.

Figure 4:
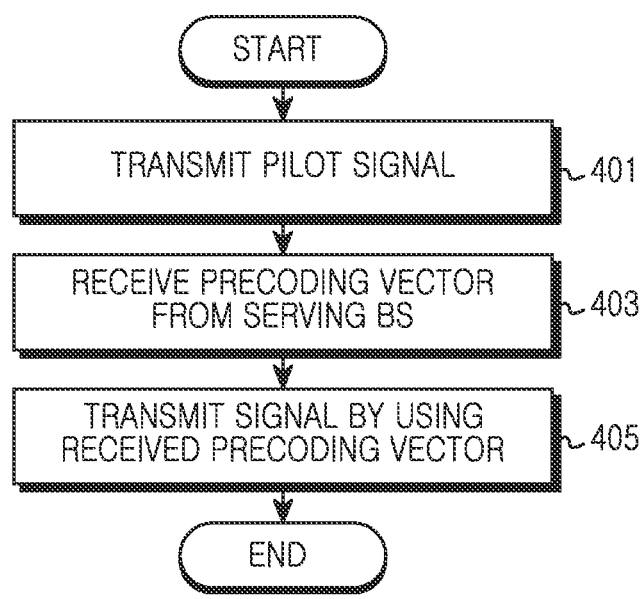
FIG. 4 is a flowchart illustrating an operation procedure of a Mobile Station (MS) in a wireless communication system according to an exemplary embodiment of the present invention.

FIG. 4 illustrates an operation procedure of an MS in a wireless communication system according to an exemplary embodiment of the present invention.

Referring to FIG. 4, in step 401, the MS transmits a pilot signal. At this time, the pilot signal can be transmitted to not only a serving BS of the MS but also a neighboring BS exerting interference mutually with the serving BS.

After that, in step 403, the MS receives a precoding vector from the serving BS and then, in step 405, the MS transmits a signal to the serving BS by using the received precoding vector.

Figure 5:
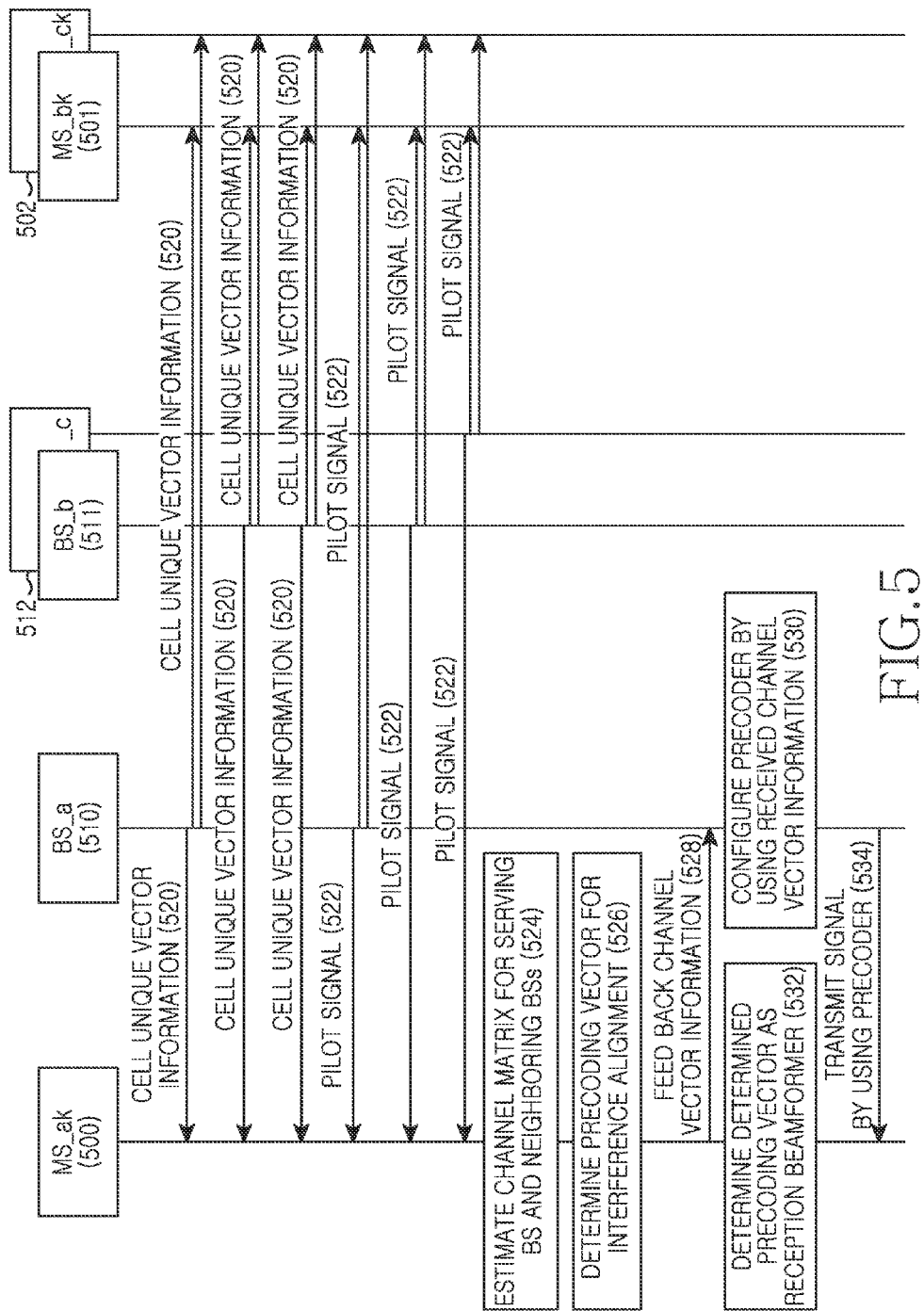
FIG. 5 is a ladder diagram illustrating a signal flow for downlink interference alignment in a wireless communication system according to another exemplary embodiment of the present invention.

FIG. 5 illustrates a signal flow for downlink interference alignment in a wireless communication system according to another exemplary embodiment of the present invention. Here, a BS_a 510, a BS_b 511, and a BS_c 512 are located in adjacent areas and exert interference to one another. At this time, an MS_ak 500 is a k-th MS that communicates with the BS_a 510, an MS_bk 501 is a k-th MS that communicates with the BS_b 511, and an MS_ck 502 is a k-th MS that communicates with the BS_c 512. Also, it is assumed that N≥(L−1)M is met when the number of antennas of an MS is given 'N', the number of antennas of a BS is given 'M', and the number (N) of BSs exerting interference to one another is equal to '3'.

Referring to FIG. 5, for the sake of interference alignment according to the present exemplary embodiment, in step 520, the BS_a 510, the BS_b 511, and the BS_c 512 each broadcast information about preset cell unique vectors to a served MS and neighboring MSs. Next, in step 522, the BS_a 510, the BS_b 511, and the BS_c 512 each broadcast pilot signals to the served MS and the neighboring MSs. Here, the information about the cell unique vector can be broadcasted through a system information block. At this time, the MS_ak 500, the MS_bk 501, and the MS_ck 502 each can receive the information about the cell unique vectors and the pilot signals from the BS_a 510, the BS_b 511, and the BS_c 512.

After that, in step 524, the MS_ak 500 estimates channels for a serving BS and neighboring BSs. That is, the MS_ak 500 estimates a channel ($H_{a,k}$) for the BS_a 510 that is the serving BS and interference channels ($G_{b,a,k}$ and $G_{c,a,k}$) for the BS_b 511 and BS_c 512 that are the neighboring BSs exerting interference to the MS_ak 500. Here, '$G_{b,a,k}$' in the downlink means an interference channel from the BS_b 511 to a k-th MS (i.e., the MS_ak 500) that belongs to the BS_a 510.

Next, in step 526, the MS_ak 500 determines a precoding vector for the MS_ak 500 by using the scheme given in Equation 5 and Equation 6 shown above. That is, the MS_ak 500 determines a precoding vector ($w_{a,k}$) to be used for a signal that the BS_a 510 transmits to the MS_ak 500, by using Equation 6 shown above.

After that, in step 528, the MS_ak 500 feeds back channel vector information to the BS_a 510 through a feedback channel. Here, the channel vector information is expressed as a multiplication ($H_{a,k} w_{a,k}$) of the channel ($H_{a,k}$) estimated for the BS_a 510 and the determined precoding vector ($w_{a,k}$).

Next, the BS_a 510 receives channel vector information from all served MSs served by the BS_a 510 and then, in step 530, the BS_a 510 configures a precoder by using the received channel vector information. After that, in step 534, the BS_a 510 transmits a signal to the MS_ak 500 by using the precoder. According to this, the signal transmitted to the MS_ak 500 is precoded using the precoding vector determined by the MS_ak 500.

In the meantime, the MS_ak 500 sets the precoding vector ($w_{a,k}$) as a reception beamformer to form a reception beam in step 532. Thereafter, the MS_ak 500 receives the signal from the BS_a 510 in step 534.

Although not illustrated in FIG. 5, the MS_bk 501 and MS_ck 502 and the BS_b 511 and BS_c 512 may perform the processes of step 524 to step 534 using the same described herein, thereby being able to configure interference vectors from respective served MSs to each neighboring BS, as one spatial dimension.

Figure 6:
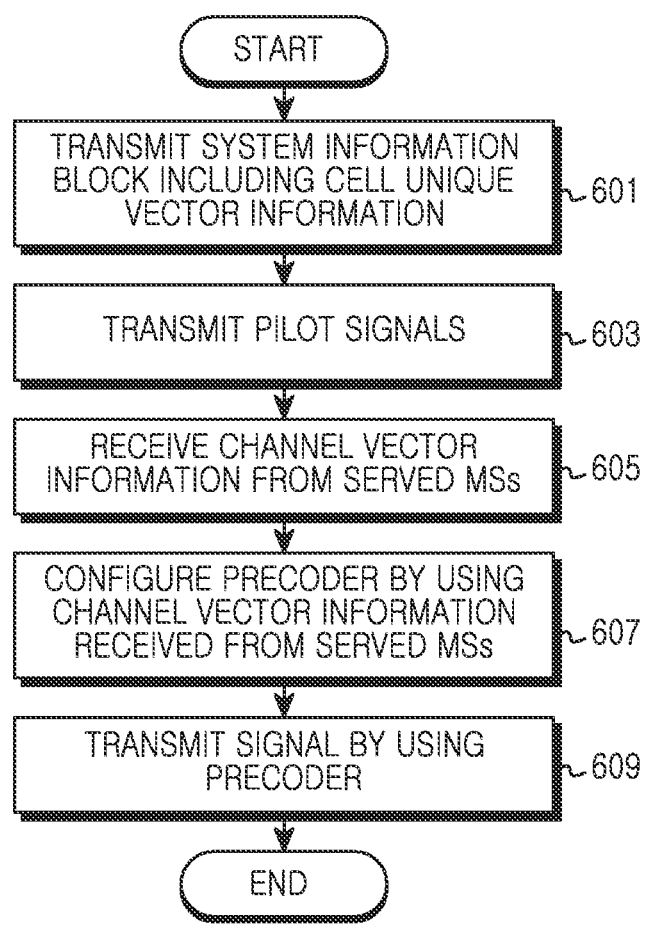
FIG. 6 is a flowchart illustrating an operation procedure of a serving BS in a wireless communication system according to another exemplary embodiment of the present invention.

FIG. 6 illustrates an operation procedure of a serving BS in a wireless communication system according to another exemplary embodiment of the present invention.

Referring to FIG. 6, in step 601, for the sake of interference alignment, the serving BS broadcasts a system information block including information about its preset cell unique vectors, to a served MS and neighboring MSs. After that, in step 603, the serving BS broadcasts pilot signals to the served MS and the neighboring MSs.

Next, in step 605, the serving BS receives channel vector information from all served MSs served by the serving BS. After that, the serving BS proceeds to step 607 and configures a precoder by using the channel vector information received from the served MSs. After that, in step 609, the serving BS transmits signals to the served MSs by using the precoder. Here, the serving BS can eliminate interference between MSs within a cell, by configuring the precoder through a zero-forcing technique.

After that, the serving BS terminates the algorithm according to the present exemplary embodiment.

Figure 7:
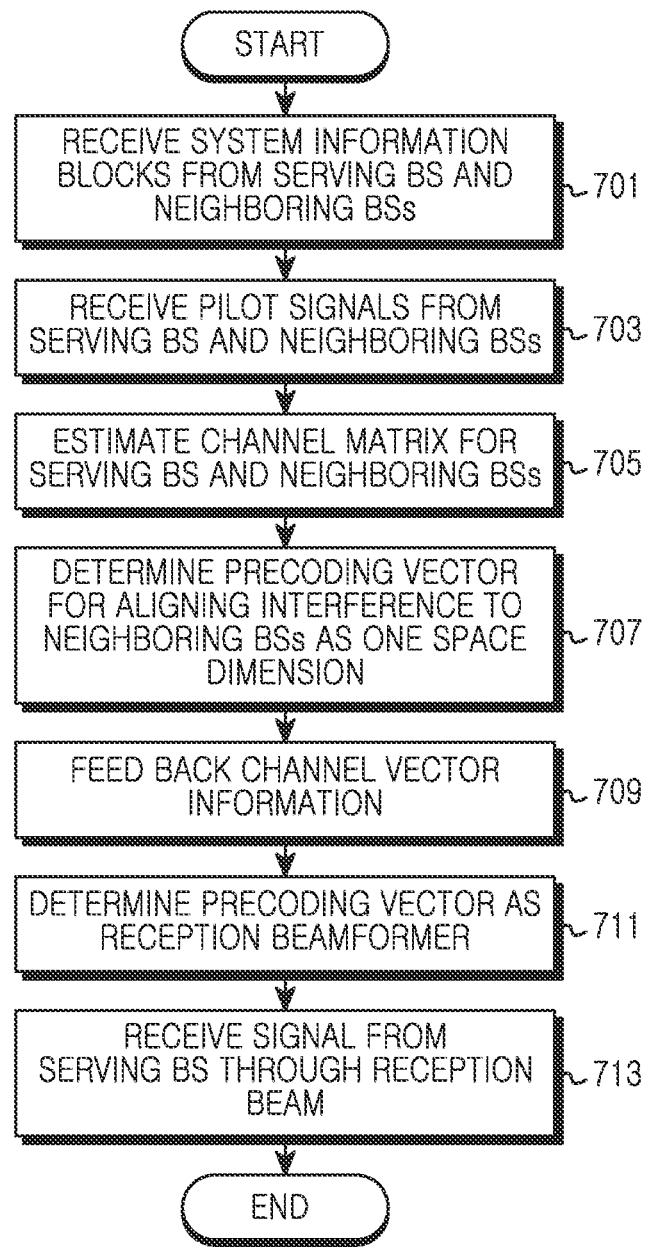
FIG. 7 is a flowchart illustrating an operation procedure of an MS in a wireless communication system according to another exemplary embodiment of the present invention.

FIG. 7 illustrates an operation procedure of an MS in a wireless communication system according to another exemplary embodiment of the present invention.

Referring to FIG. 7, in step 701, the MS receives system information blocks including cell unique vector information from a serving BS and neighboring BSs. Next, the MS proceeds to step 703 and receives pilot signals from the serving BS and the neighboring BSs.

After that, in step 705, the MS estimates a channel for the serving BS and interference channels for the neighboring BSs by using the received pilot signals. Next, in step 707, the MS determines a precoding vector for aligning interference from neighboring MSs to the respective neighboring BSs, as one spatial dimension, by using the cell unique vector information and the estimated channel information. Next, the MS generates channel vector information by using the determined precoding vector and estimated channel information and then, in step 709, the MS feeds back the channel vector information to the serving BS.

Next, in step 711, the MS determines the precoding vector as a reception beamformer to form a reception beam. After that, the MS proceeds to step 713 and receives a signal from the serving BS through the reception beam. After that, the MS terminates the algorithm according to the present invention.

Figure 8:
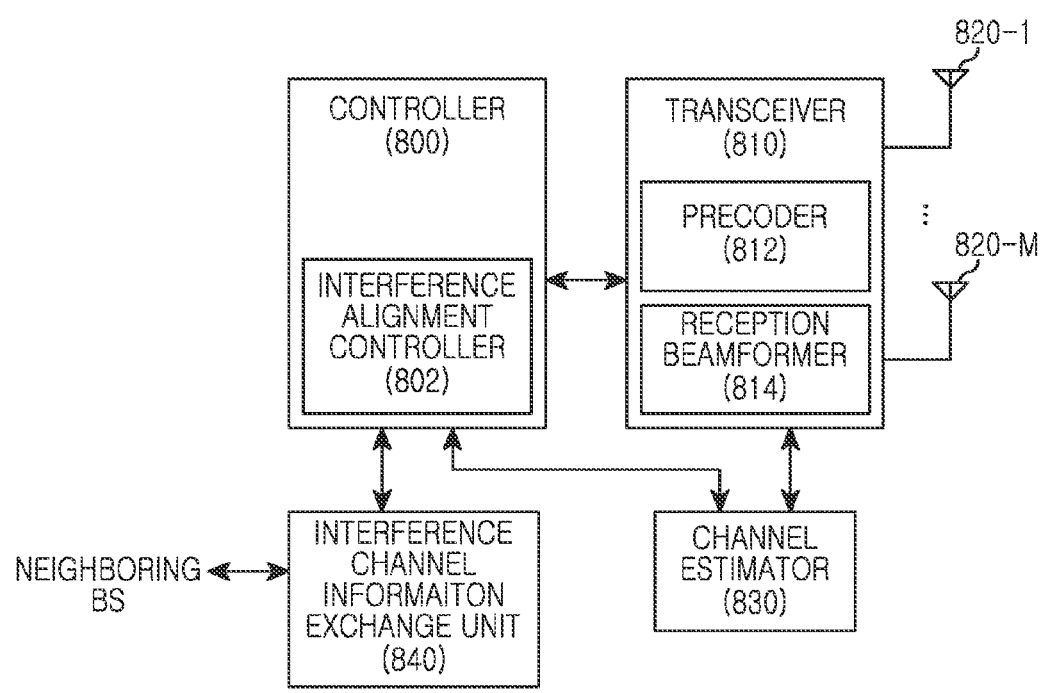
FIG. 8 is a block diagram illustrating a construction of a BS in a wireless communication system according to an exemplary embodiment of the present invention.

FIG. 8 is a block diagram illustrating a construction of a BS in a wireless communication system according to an exemplary embodiment of the present invention.

Referring to FIG. 8, the BS includes a controller 800, a transceiver 810, a plurality of antennas 820-1 to 820-M, a channel estimator 830, and an interference channel information exchange unit 840.

The controller 800 controls and processes general operations of the BS, and in particular, controls and processes a function for aligning interference channels according to the present exemplary embodiment. Particularly, by including an interference alignment controller 802, the controller 800 controls and processes a function for determining precoding vectors of served MSs for uplink, and configuring a precoder for downlink.

The interference alignment controller 802 controls a function for, to determine precoding vectors of served MSs for uplink, estimating a channel for each of the served MSs and an interference channel for each of neighboring MSs, and exchanging cell unique vector information and estimated interference channel information with neighboring BSs. The interference alignment controller 802 determines a precoding vector of each of the served MSs for aligning interference from the served MSs to the neighboring BS as one spatial dimension in the neighboring BS, by using the exchanged cell unique vector information and interference channel information. The interference alignment controller 802 can determine the precoding vectors of the served MSs through the scheme given in Equation 5 shown above. Next, the interference alignment controller 802 controls and processes a function for transmitting the precoding vector for each of the served MSs to the corresponding served MS. At this time, the interference alignment controller 802 controls and processes a function for forming a reception beam for receiving an uplink signal, by using the precoding vectors for the respective served MSs.

Further, the interference alignment controller 802 controls and processes a function for broadcasting cell unique vector information in order to determine precoding vectors of served MSs for the downlink to configure a precoder, and controls and processes a function for receiving the precoding vectors from the served MSs and, by the received precoding vectors, configuring a precoder 812.

The transceiver 810 transmits/receives signals through the plurality of antennas 820-1 to 820-M according to the control of the controller 800. The transceiver 810 includes the precoder 812 and a reception beamformer 814. Although not illustrated in FIG. 8, the transceiver 810 may include a plurality of coders, a plurality of modulators, a plurality of subcarrier mappers, and a plurality of Radio Frequency (RF) transmitters. The precoder 812 processes a signal transmitted to each MS by using precoding vectors determined according to the control of the controller 800. The precoder 812 can eliminate interference between served MSs of the BS by using a zero-forcing technique. The reception beamformer 814 can form a reception beam for receiving a signal from the served MS, by using a reception beamforming vector provided according to the control of the controller 800.

The channel estimator 830 estimates channels by using pilot signals or sounding signals received from served MSs and neighboring MSs according to the control of the controller 830, and provides the channel estimation results to the controller 800. That is, the channel estimator 830 estimates a channel with the served MS by using the pilot signal or sounding signal received from the served MS, and estimates interference channels with the neighboring MSs by using the pilot signals or sounding signals received from the neighboring MSs.

To determine the precoding vector of the served MS for uplink, the interference channel information exchange unit 840 exchanges interference channel information with neighboring BSs exerting interference, and provides the interference channel information to the controller 800. Here, the interference channel information exchanged with the neighboring BSs includes cell unique vector information corresponding to each BS and an interference channel estimated by each BS.

Figure 9:
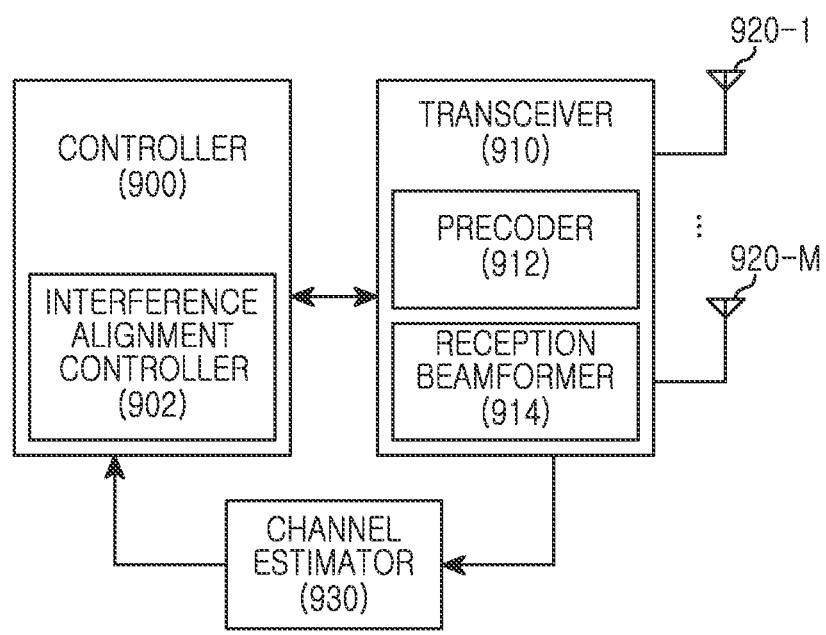
FIG. 9 is a block diagram illustrating a construction of an MS in a wireless communication system according to an exemplary embodiment of the present invention.

FIG. 9 is a block diagram illustrating a construction of an MS in a wireless communication system according to an exemplary embodiment of the present invention.

Referring to FIG. 9, the MS includes a controller 900, a transceiver 910, a plurality of antennas 920-1 to 920-M, and a channel estimator 930.

The controller 900 controls and processes general operations of the MS, and in particular, controls and processes a function for aligning interference channels according to the present exemplary embodiment. Particularly, by including an interference alignment controller 902, the controller 900 controls and processes a function for setting a precoding vector for uplink, determining a precoding vector for downlink, and transmitting the precoding vectors to a BS.

The interference alignment controller 902 controls a function for receiving precoding vector information from a serving BS and, upon uplink signal transmission, processing a signal by using the received precoding vector. Also, the interference alignment controller 902 controls and processes a function for, to determine downlink precoding vectors for the MS, receiving cell unique vector information and pilot signals from the serving BS and neighboring BSs, and estimating a channel for the serving BS and interference channels for the neighboring BSs. After that, the interference alignment controller 902 determines a precoding vector for aligning interference vectors to the neighboring BSs as one spatial dimension, by using the received cell unique vector information and estimated channel information. The interference alignment controller 902 can determine the precoding vector through the scheme given in Equation 5 shown above. Next, the interference alignment controller 902 controls and processes a function for transmitting the precoding vector to the serving BS, and forming a reception beam by using the precoding vector.

The transceiver 910 transmits/receives signals through the plurality of antennas 920-1 to 920-M according to the control of the controller 900. The transceiver 910 includes a precoder 912 and a reception beamformer 914. Although not illustrated in FIG. 9, the transceiver 910 may include a plurality of coders, a plurality of modulators, a plurality of subcarrier mappers, and a plurality of RF transmitters. The precoder 912 processes a signal transmitted to a BS by using a precoding vector received from the BS according to the control of the controller 900. By using a zero-forcing technique, the precoder 912 can eliminate interference with other MSs belonging to the serving BS. By using the precoding vector provided according to the control of the controller 900 as a reception beamforming vector, the reception beamformer 914 can form a reception beam for receiving a signal from the serving BS.

According to the control of the controller 900, the channel estimator 930 estimates channels by using pilot signals received from a serving BS and neighboring BSs, and provides the channel estimation results to the controller 900. That is, the channel estimator 930 estimates a channel with the serving BS by using the pilot signal received from the serving BS, and estimates interference channels from the neighboring BSs by using the pilot signals received from the neighboring BSs.

As described above, exemplary embodiments of the present invention have an effect of being capable of performing interference alignment, transmitting/receiving a signal through a spatial dimension of no interference, and improving a data transfer rate and a reliability of communication in an actual environment where a plurality of cells exist, by determining a precoding vector for configuring interference vectors for an MS or a BS as one spatial dimension and transmitting a signal through the determined precoding vector in a wireless communication system of a multi-cell and multi-antenna environment.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a base station (BS) serving a terminal in a wireless communication system, the method comprising:
   receiving, from each of at least one neighboring BS, each predetermined vector for each of the at least one neighboring BS and channel state information for each channel between the terminal and each of the at least one neighboring BS;
   determining a precoding vector based on the channel state information for the each channel and the each predetermined vector;
   transmitting, to the terminal, the precoding vector; and
   receiving, from the terminal, data precoded by the precoding vector,
   wherein the each predetermined vector is to determine a spatial dimension for an interference, caused by the data, to each of the at least one neighboring BS.

2. The method of claim 1, further comprising:
   estimating a channel between the terminal and the BS; and
   transmitting channel state information for the channel and a predetermined vector of the BS to each of the at least one neighboring BS.

3. The method of claim 1, wherein the precoding vector configures each interference vector from the terminal to each of the at least one neighboring BS to have a same spatial dimension as each of the predetermined vectors.

4. The method of claim 1, further comprising forming a reception beam for the terminal by using the precoding vector.

5. The method of claim 1, wherein the terminal comprises a first plurality of antennas and the BS comprises a second plurality of antennas, the method further comprising:
   performing a signal transmission or a signal reception by using a fewer number of antennas among the second plurality of antennas than a threshold number of antennas,
   wherein the threshold number of antennas is determined based on the number of the first plurality of antennas.

6. The method of claim 1, wherein a number of each of the at least one neighboring BS is two or more.

7. The method of claim 5, wherein the threshold number of antennas is determined based further on a number of the BS and the at least one neighboring BS.

8. The method of claim 7, wherein the threshold number is the number of the first plurality of antennas divided by one fewer number of the BS and each of the at least one neighboring BS.

9. The method of claim 1, wherein the terminal is within a coverage of the BS and out of a coverage of each of the at least one BS.

10. An apparatus of a base station (BS) serving a terminal in a wireless communication system, the apparatus comprising:
    a transceiver configured to receive, from each of at least one neighboring BS, each predetermined vector for each of the at least one neighboring BS and channel state information for each channel between the terminal and each of the at least one neighboring BS; and
    a controller configured to determine a precoding vector based on the channel state information for the each channel and the each predetermined vector,
    wherein the transceiver is further configured to:
    transmit, to the terminal, the precoding vector, and
    receive, from the terminal, data precoded by the precoding vector, and wherein the each predetermined vector is to determine a spatial dimension for an interference, caused by the data, to each of the at least one neighboring BS.

11. The apparatus of claim 10,
wherein the controller is further configured to estimate a channel between the terminal and the BS, and
wherein the transceiver is further configured to transmit channel state information for the channel and a predetermined vector of the BS to each of the at least one neighboring BS.

12. The apparatus of claim 10, wherein the precoding vector configures each interference vector from the terminal to each of the at least one neighboring BS to have a same spatial dimension as each of the predetermined vectors.

13. The apparatus of claim 10,
wherein the terminal comprises a first plurality of antennas and the BS comprises a second plurality of antennas,
wherein the controller is further configured to perform a signal transmission or a signal reception by using a fewer number of antennas among the second plurality of antennas than a threshold number of antennas, and
wherein the threshold number of antennas is determined based on the number of the first plurality of antennas.

14. The apparatus of claim 10,
wherein the controller is further configured to form a reception beam for the terminal by using the precoding vector.

15. The apparatus of claim 10, wherein a number of each of the at least one neighboring BS is two or more.

16. The apparatus of claim 13, wherein the threshold number of antennas is determined based further on a number of the BS and each of the at least one neighboring BS.

17. The apparatus of claim 16, wherein the threshold number is the number of the first plurality of antennas divided by one fewer number of the BS and each of the at least one neighboring BS.

18. The apparatus of claim 10, wherein the terminal is within a coverage of the BS and out of a coverage of each of the at least one BS.

* * * * *